(12) United States Patent
Sugino (10) Patent No.: US 7,728,993 B2
(45) Date of Patent: Jun. 1, 2010

(54) IMAGE FORMING APPARATUS, CONTROL METHOD AND STORAGE MEDIUM IN WHICH A SELECTING DEVICE SELECTS A PRINT FUNCTION OR A COPY FUNCTION

(75) Inventor: Kazumasa Sugino, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 987 days.

(21) Appl. No.: 11/097,342

(22) Filed: Apr. 4, 2005

(65) Prior Publication Data
US 2005/0179927 A1 Aug. 18, 2005

Related U.S. Application Data

(62) Division of application No. 09/793,097, filed on Feb. 27, 2001, now Pat. No. 7,190,484.

(30) Foreign Application Priority Data

| Feb. 29, 2000 | (JP) | ............................. 2000-052918 |
| Feb. 29, 2000 | (JP) | ............................. 2000-052920 |
| Feb. 29, 2000 | (JP) | ............................. 2000-052955 |
| Feb. 26, 2001 | (JP) | ............................. 2001-050973 |
| Feb. 26, 2001 | (JP) | ............................. 2001-050974 |
| Feb. 26, 2001 | (JP) | ............................. 2001-050975 |

(51) Int. Cl.
*G06F 3/12* (2006.01)
*G06K 15/00* (2006.01)

(52) U.S. Cl. .................................... 358/1.13; 358/1.14

(58) Field of Classification Search ................ 358/1.1, 358/1.2, 1.9, 1.12, 1.13, 1.14, 1.15, 1.18, 358/401, 403, 407, 448, 474, 471; 399/144, 399/8, 87

See application file for complete search history.

(56) References Cited

U.S. PATENT DOCUMENTS

| 5,956,557 | A   |   | 9/1999 | Kato et al. |
| 6,064,838 | A   | * | 5/2000 | Maruta et al. .................. 399/79 |
| 6,168,325 | B1  | * | 1/2001 | Nagata .................. 400/120.01 |
| 6,452,689 | B1  |   | 9/2002 | Srinivasan .................. 358/1.15 |
| 6,583,888 | B1  |   | 6/2003 | Salgado et al. ............. 358/1.15 |
| 6,612,758 | B2  | * | 9/2003 | Yokoyama .................. 400/70 |
| 6,992,784 | B1  | * | 1/2006 | Kohtani et al. ............. 358/1.15 |

(Continued)

FOREIGN PATENT DOCUMENTS

JP 10-105007 4/1998

(Continued)

*Primary Examiner*—Gabriel I Garcia
(74) *Attorney, Agent, or Firm*—Fitzpatrick, Cella, Harper & Scinto (57) ABSTRACT

An image forming apparatus includes a receiving device which receives data to be printed. a reading device which reads a document, a selecting device which selects one of a print function of printing the data received by the receiving device and a copy function of printing the data read by the reading device, in accordance with an operation of a user, and a control device which inhibits printing by the copy function even if the document is set in the reading device, and changes a state of the receiving device from a state of not receiving the data to a state of receiving the data, when the print function is selected by the selecting device.

5 Claims, 10 Drawing Sheets

U.S. PATENT DOCUMENTS

| | | | |
|---|---|---|---|
| 7,180,628 B1 * | 2/2007 | Motohashi et al. | 358/1.9 |
| 2001/0012124 A1 * | 8/2001 | Morikawa | 358/296 |
| 2002/0048035 A1 * | 4/2002 | Beaudet et al. | 358/1.14 |
| 2007/0109584 A1 * | 5/2007 | Motohashi et al. | 358/1.13 |

FOREIGN PATENT DOCUMENTS

| | | |
|---|---|---|
| JP | 10-154032 | 5/1998 |
| JP | 11-272134 | 10/1999 |

\* cited by examiner

IMAGE FORMING APPARATUS, CONTROL METHOD AND STORAGE MEDIUM IN WHICH A SELECTING DEVICE SELECTS A PRINT FUNCTION OR A COPY FUNCTION

The present application is a divisional application of U.S. patent application Ser. No. 09/793,097, filed Feb. 27, 2001, and which issued as U.S. Pat. No. 7,190,484 on Mar. 13, 2007, the entire contents of which is incorporated herein by reference.

This application also claims the right of priority under 35 U.S.C. §119 based on Japanese Patent Application Nos. 2000-052918, 2000-052920, and 2000-052955, each filed on Feb. 29, 2000, and Japanese Patent Application Nos. 2001-050973, 2001-050974, 2001-050975, each filed on Feb. 26, 2001, each of which is hereby incorporated by reference herein in its entirety as if fully set forth herein.

BACKGROUND OF THE INVENTION

1. Field of the Invention

The invention relates to an image forming apparatus and to its control method.

2. Related Background Art

In association with the digitalization of copying apparatuses, a hybrid apparatus having a plurality of functions, such as a facsimile function for performing facsimile transmission and reception by using a scanner function, a printer function, a PDL (Page Description Language) printer function, and the like, has been put into practical use. Such a hybrid apparatus can operate not only as a single function, such as a copy function, facsimile function, PDL printer function, or the like, but also, among a plurality of functions, such that a PDL developed image is facsimile transmitted, and the like. Further, by connecting the hybrid apparatus via a LAN, the functions of the hybrid apparatus can be used by computer apparatuses, and the like.

In a copying apparatus, an apparatus having a function for performing a charging process in accordance with a paper size of a copied image, a kind of paper, the number of papers, color/monochrome, or the like, has been put into practical use. In such a copying apparatus, the user can set a copy irrespective whether sufficient coins have been inserted or not, and a control, such that the copying operation is not started or is interrupted, if the coins are insufficient at a stage when the copy is actually executed in accordance with the setting, is performed.

If a charging system of the coin throw-in type, in the same format, is applied to a PDL printer or a hybrid apparatus having a PDL printer function, there are the following problems.

If print data can be sent from a computer before the coins are thrown in, another user cannot use such an apparatus until coins are thrown in.

Even if there is no user who wants to use the apparatus, the received data has to be stored until coins are thrown in. This results in an increase in the capacity of a memory and causes an increase in costs. A timing control of erasure of data, and the like, also has to be performed, and the control becomes complicated.

In the case of a copy, unless a necessary amount of money is paid, an original is not read. In the case of the PDL printer function, however, a necessary amount of money is unknown until sufficient data is received and analyzed. Therefore, when data of a plurality of pages is received at one time, there is a possibility that the amount of money paid by the user is insufficient, before all of the data which has already been received, is printed. However, such a situation is not presumed in the charging system of the coin throw-in type used in a conventional copying apparatus.

During the printing of the data of a plurality of pages, if the printing cannot be performed at the halfway point due to convenience of an amount of money, or the like, possessed by the user, and there is data remaining in the hybrid apparatus without being printed, there is a concern that when another user intends to make a copy by using the copy function and throws coins into the apparatus, the remaining data is outputted as unusable data.

In a state when a user forgets to remove an original, and there is a copy original on a copyboard, if another user intends to print a copy by using the printer function, throws coins into the apparatus, and presses a start key, there is also a concern that a copy of the original on the copyboard is outputted as being unusable data.

In the conventional copying apparatus, since the originals are read one by one (every single side) in a both-side copying mode, each time a single side is printed, a process is interrupted, and the copy is executed while charging. The reason why there is not trouble, even if the printing to a single side is interrupted mainly at the time of a platen, as mentioned above, is because the user himself who requested the both-side printing performs the printing by inserting coins while perceiving the progress of the operation.

In the case of the PDL data, in the both-side printing mode, since the printing of the data for both sides is requested in a group, the charging process of the conventional copying apparatus, which performs the charging process for every single side, cannot be used as it is, in common.

That is, if only the data for a single side is printed due to an insufficient fee (coins), or the like, in spite of a fact that the data for both sides has been received, a complicated process is requested of the user. For example, when the user sends data for two pages, if only a single side is printed, in order to print the second side, the user has to edit the data and send the data of only the second side again.

As mentioned above, if the conventional copy charging system of the coin throw-in type is applied to the PDL printer or the hybrid apparatus having the PDL printer function, various problems arise.

SUMMARY OF THE INVENTION

It is an object of the invention to enable a copy charging system to be applied also to an image processing apparatus having a function for print outputting data, such as PDL data, or the like.

Another object of the invention is to enable the payment of a fee to a coin receiving unit, or the like, to be recognized, and to enable an image forming apparatus having a printer function to be properly and efficiently controlled.

Another object of the invention is to prevent data, which is not desired by the user, from being outputted.

Still another object of the invention is to reduce a load on the user in the case of both-side printing the transferred data.

The above and other objects and features of the present invention will become apparent from the following detailed description, and the appended claims, with reference to the accompanying drawings.

DETAILED DESCRIPTION OF THE PREFERRED EMBODIMENTS

First Embodiment

A preferred embodiment of the invention will now be described herein below with reference to the drawings.

Figure 1:
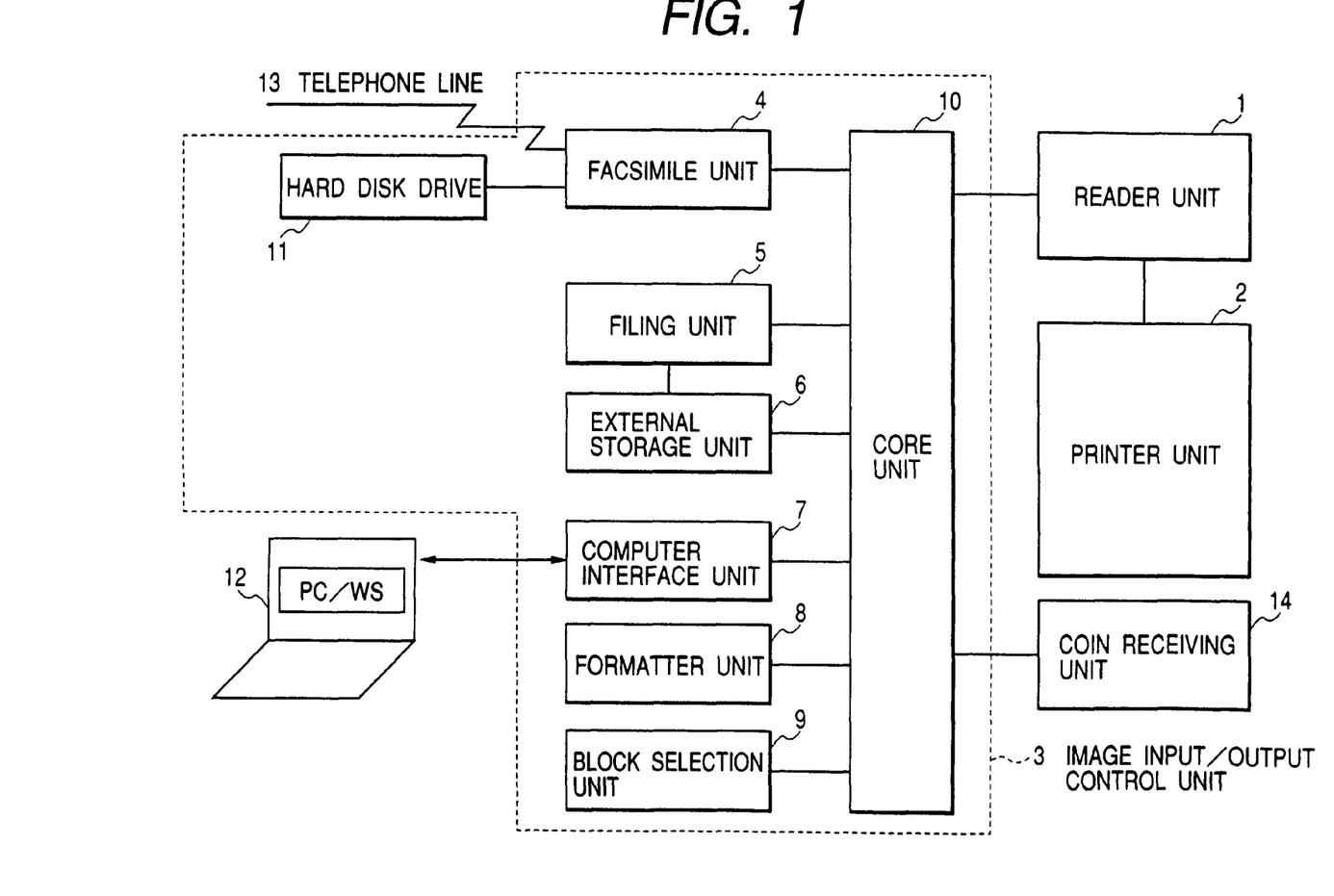
FIG. 1 is a block diagram of an image processing apparatus in an embodiment of the invention.

FIG. 1 is a block diagram showing a construction of an image processing apparatus of the embodiment. In the diagram, a reader unit 1 reads an image of an original and outputs image data corresponding to the original image to a printer unit 2 and an image input/output control unit 3. The printer unit 2 records an image corresponding to the image data from the reader unit 1 and image input/output control unit 3 onto a recording paper. The image input/output control unit 3 is connected to the reader unit 1 and includes a facsimile unit 4, a filing unit 5, a computer interface unit 7 for a network, a formatter unit 8, a block selection unit 9, a core unit 10, and the like.

The facsimile unit 4 decompresses compressed image data received through a telephone line 13 and transfers the decompressed image data to the core unit 10. The facsimile unit 4 also compresses the image data transferred from the core unit 10 and transmits the compressed image data through the telephone line 13. A hard disk drive 11 is connected to the facsimile unit 4 and can temporarily store the received compressed image data.

An external storage unit, namely, a magneto-optical disk drive unit 6, is connected to the filing unit 5. The filing unit 5 compresses the image data transferred from the core unit 10 and stores the image data onto a magneto-optical disk set in the magneto-optical disk drive unit 6 together with a keyword for searching the image data. The filing unit searches the compressed image data stored on the magneto-optical disk on the basis of the keyword transferred through the core unit 10, reads out the searched compressed image data, decompresses it, and transfers the decompressed image data to the core unit 10.

The computer interface unit 7 is an interface between a personal computer or workstation (PC/WS) 12 and the core unit 10, and supports networks in a range from a serial basic interface, or the like, to the LAN (Local Area Network). As a network function, a protocol, such as Netware, TCP/IP, Ether Talk, or the like, is supported on the serial (SLIP) or LAN, and the services of an upper layer, such as NFS, or the like, are also supported.

The formatter unit 8 develops code data indicative of an image transferred from the PC/WS 12 into image data, which can be recorded by the printer unit 2.

The block selection unit 9 stores the image data, analyzes the stored image data, classifies it into a text portion and an image portion, and manages the classified data and its layout information, so as to be concerned with each other.

Although the core unit 10 will be explained hereinafter, the core unit 10 controls a flow of data between the respective reader unit 1, facsimile unit 4, filing unit 5, computer interface unit 7, formatter unit 8, block selection unit 9, and a coin receiving unit 14.

The coin receiving unit 14 notifies the core unit 10 of an amount of coins thrown in by the user. If the coin receiving unit 14 manages a fee regarding monochrome/color, information regarding whether a monochrome/color printing can be performed or not, the number of printable copies in each of the monochrome/color printing modes, and the like, also can be performed. The core unit 10 receives a notification from the coin receiving unit 14 and, thereafter, activates a screen or executes the printing operation.

Figure 2:
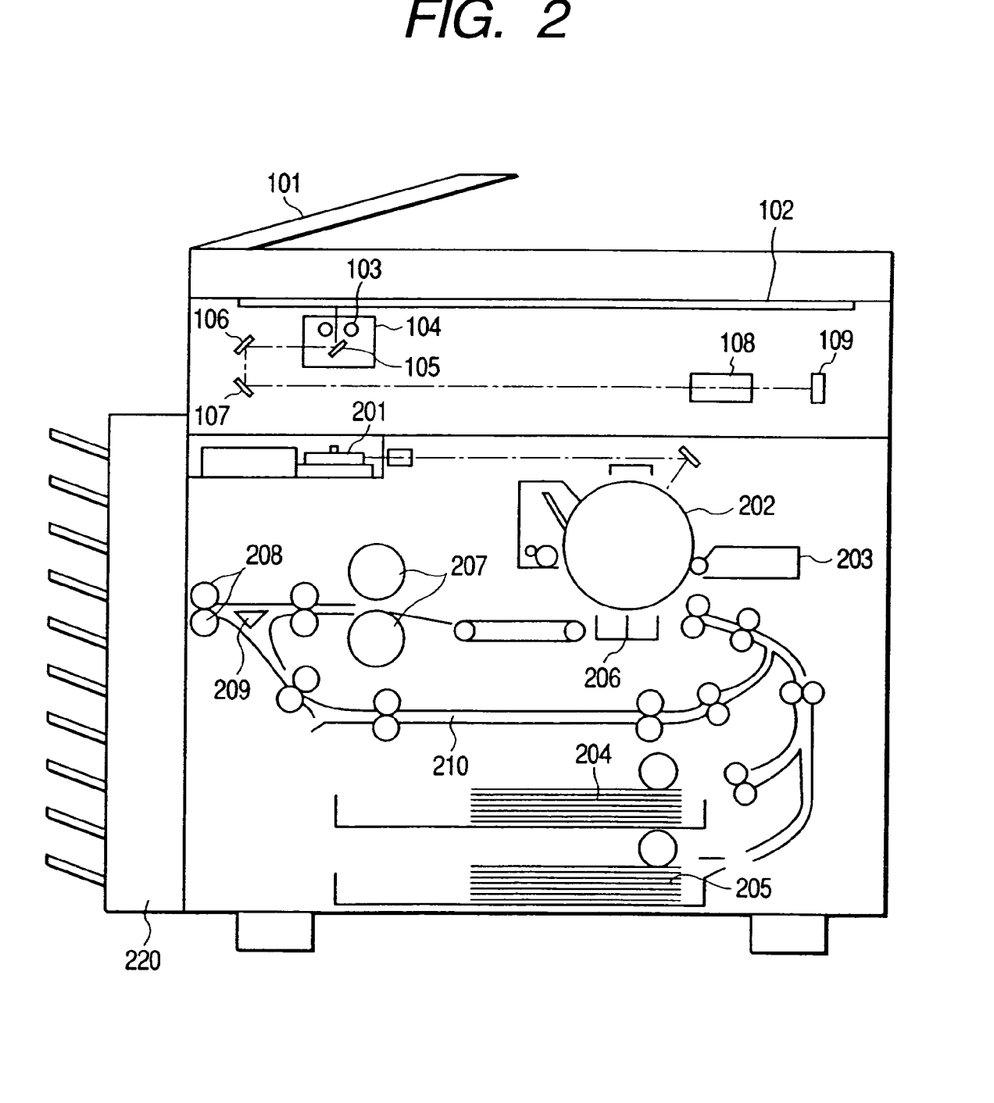
FIG. 2 is a cross-sectional view of a reader unit and a printer unit in an embodiment of the invention.

FIG. 2 is a cross-sectional view showing a construction of the reader unit 1 and printer unit 2. A document feeder 101 of the reader unit 1 feeds the originals one by one in order from the last page onto a platen glass 102. After completion of the reading operation of the original, the original is delivered onto the platen glass 102. When the original is conveyed onto the platen glass 102, a lamp 103 is turned on, the movement of a scanner unit 104 is started, and the original is exposed and scanned. Reflection light from the original at this time is guided to a CCD image sensor (hereinafter, abbreviated to CCD) 109 by mirrors 105, 106, and 107, and a lens 108.

The image of the original scanned, as mentioned above, is read by the CCD 109. The image data, which is outputted from the CCD 109, is subjected to predetermined processes and, thereafter, the processed image data is transferred to the printer unit 2 and the core unit 10 of the image input/output control unit 3.

A laser driver 221 of the printer unit 2 drives a laser emitting unit 201 and allows the laser emitting unit 201 to emit a laser beam according to the image data outputted from the reader unit 1. The laser beam is irradiated onto a photosensitive drum 202, so that a latent image according to the laser beam is formed on the photosensitive drum 202. A developing agent is adhered to the latent image portion on the photosensitive drum 202 by a developing unit 203. The recording paper is fed out from either a cassette 204 or 205 at a timing synchronized with the start of irradiation of the laser beam and conveyed to a transfer unit 206. The developing agent adhered on the photosensitive drum 202 is transferred onto the recording paper. The recording paper, on which the developing agent has been transferred, is conveyed to a fixing unit 207. The developing agent is fixed onto the recording paper by heat and pressure of the fixing unit 207.

The recording paper, which passed through the fixing unit 207, is delivered by delivery rollers 208. A sorter 220 encloses the delivered recording papers onto each bin, thereby sorting the recording papers. When a sorting mode is not set, the sorter 220 sorts the recording papers onto the top bin. When the both-side recording mode is set, the recording paper is conveyed to the delivery rollers 208 and, thereafter, the rotating direction of the delivery rollers 208 is reversed, thereby guiding the recording paper to a paper refeed conveying path 210 by a flapper 209. When a multiple recording mode is set, the recording paper is guided to the paper refeed conveying path 210 by the flapper 209, so as not to convey it to the delivery rollers 208. The recording paper guided to the paper refeed conveying path 210 is fed to the transfer unit 206 at the timing mentioned above.

Figure 3:
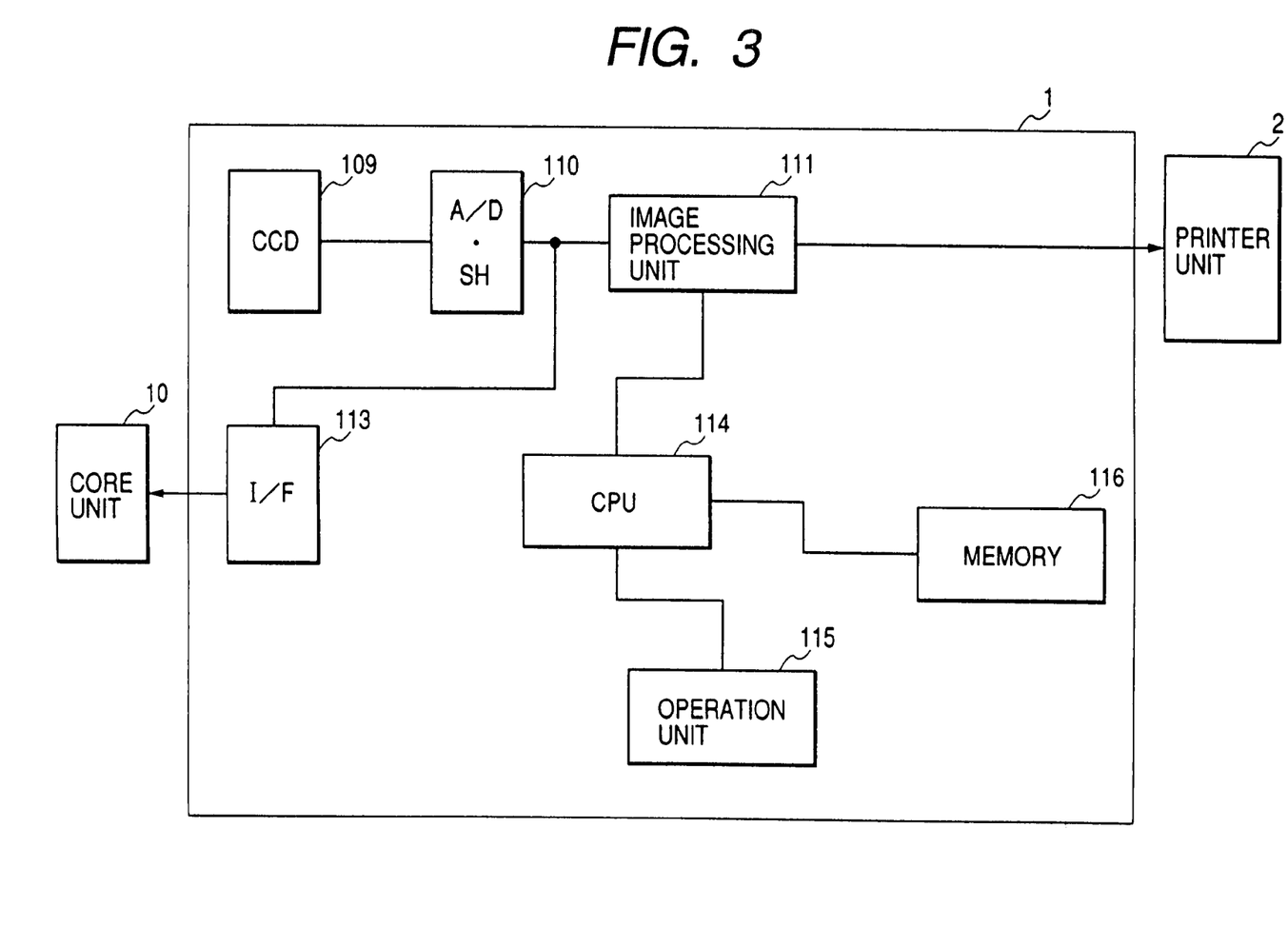
FIG. 3 is a block diagram of the reader unit in an embodiment of the invention.

FIG. 3 is a block diagram showing an example of a construction of the reader unit 1. In FIG. 3, the analog image data outputted from the CCD 109 is converted into the digital signal by an A/D●SH unit 110 and subjected to a shading correction. The image data processed by the A/D●SH unit 110 is transferred to the printer unit 2 through an image processing unit 111 and transferred to the core unit 10 of the image input/output control unit 3 through an interface 113.

A CPU 114 controls the image processing unit 111 and interface 113 in accordance with the setting contents set by an operation unit 115. For example, when a copy mode to perform a trimming process and a copy is set by the operation unit 115, the trimming process is executed in the image processing unit 111 and the processed data is transferred to the printer unit 2. When a facsimile transmitting mode is set by the operation unit 115, the image data and a control command according to the set mode are transferred from the interface 113 to the core unit 10. Such a control program of the CPU 114 has been stored in a memory 116. The CPU 114 performs the control with reference to the program in the memory 116. The memory 116 is also used as a work area of the CPU 114.

Figure 4:
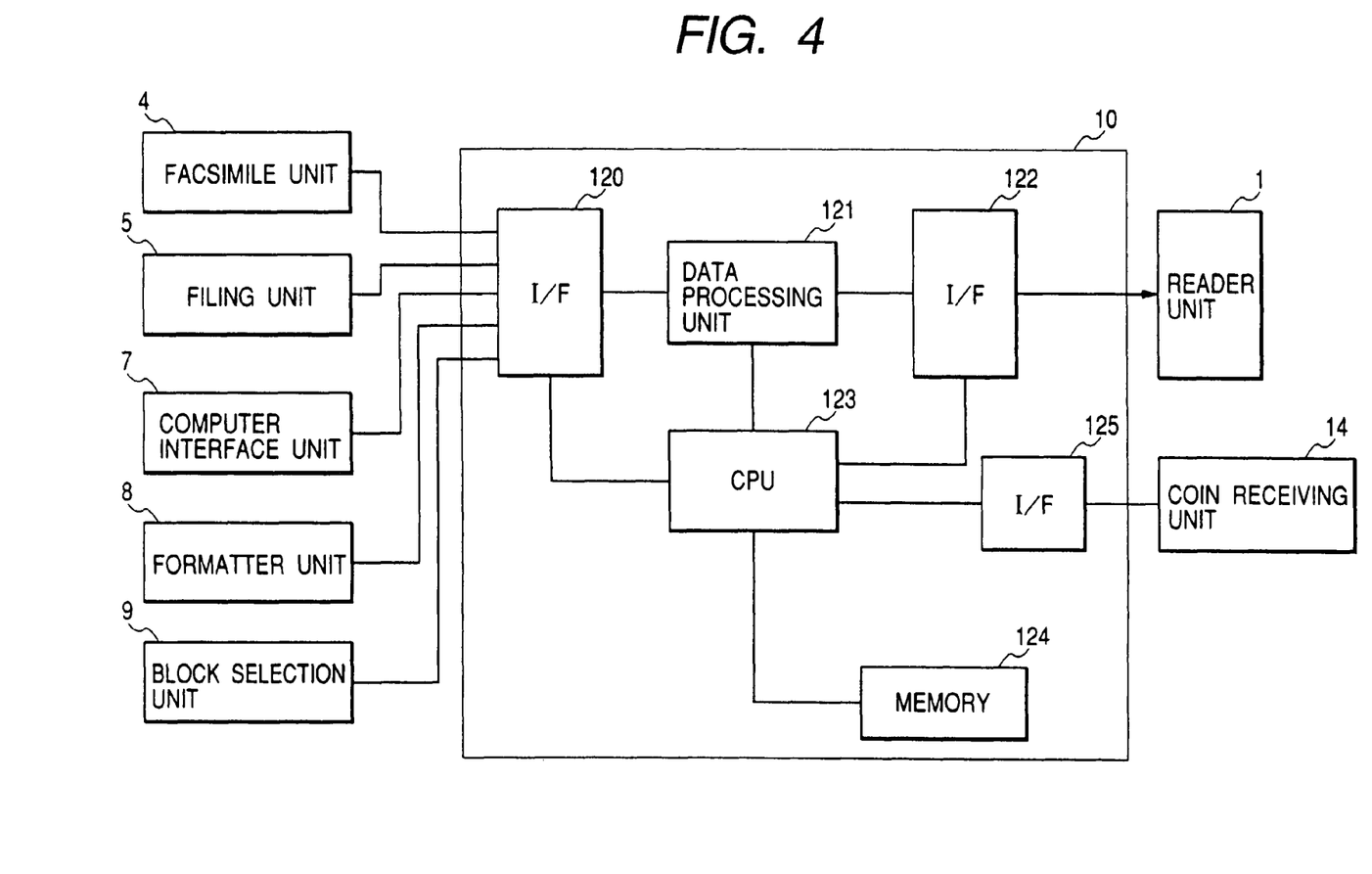
FIG. 4 is a block diagram of a core unit in an embodiment of the invention.

FIG. 4 is a block diagram showing an example of a construction of the core unit 10. In FIG. 4, the image data from the reader unit 1 is transferred to a data processing unit 121 through an interface 122. A control command of the reader unit 1 is transferred to a CPU 123 through the interface 122. The data processing unit 121 executes image processes, such as a rotating process, a zooming process, and the like, of the image. The image data transferred from the reader unit 1 to the data processing unit 121 is transferred to the facsimile unit 4, filing unit 5, and computer interface unit 7, through an interface 120, in response to the control command transferred from the reader unit 1.

Code data indicative of the image inputted through the computer interface unit 7 is transferred to the data processing unit 121 and, thereafter, transferred to the formatter unit 8 and developed into the image data. The image data is transferred to the data processing unit 121 and, thereafter, transferred to the facsimile unit 4 and printer unit 2. The image data from the facsimile unit 4 is transferred to the data processing unit 121 and, thereafter, transferred to the printer unit 2, filing unit 5, and computer interface unit 7. The image data from the filing unit 5 is transferred to the data processing unit 121 and, thereafter, transferred to the printer unit 2, facsimile unit 4, and computer interface 7.

The information from the coin receiving unit 14 is transferred to the CPU 123 through an interface 125.

The CPU 123 performs the control in accordance with a control program stored in a memory 124 and the control command transferred from the reader unit 1. The memory 124 is also used as a work area of the CPU 123. As mentioned above, it is possible to execute the processes in which the functions, such as reading of the original image, printing of the image, transmission and reception of the image, storage of the image, input/output of the data to/from the computer, and the like, are combined around the core unit 10.

Figure 5:
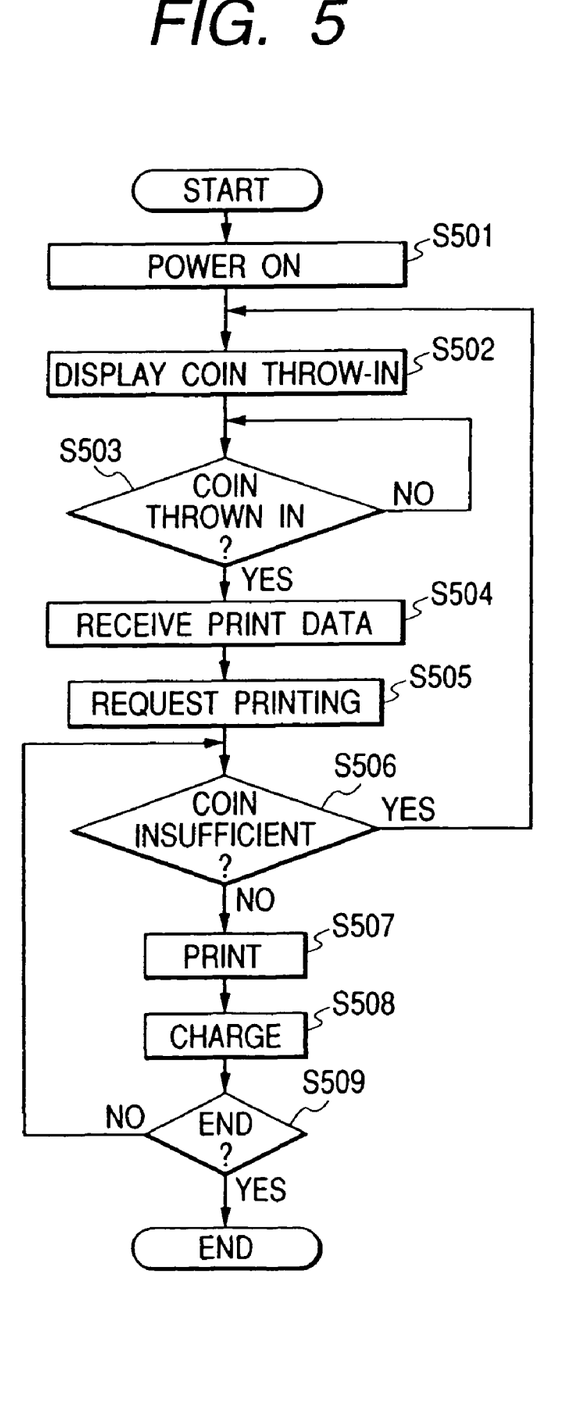
FIG. 5 is a flowchart showing an example of the operation of a charging system in the first embodiment of the invention.

Subsequently, FIG. 5 shows a flow for a charging system of a digital hybrid apparatus in the embodiment. A case when the printer function has been selected in the digital hybrid apparatus in the embodiment will now be described herein below.

A case in which another function is selected will be described in the second embodiment, which will be explained hereinafter.

In step S501 in FIG. 5, the ordinary copy activating operation is executed under the control of the core unit 10 at the same time of turn-on of a power source. Although an initializing process is executed for the formatter unit 8 (PDL), the control mode is not shifted to a mode in which the PDL (Page Description Language) data from the PC/WS 12 can be achieved, but is kept in a state where the PDL data is not received by setting the mode into a print standby mode.

Figure 6:
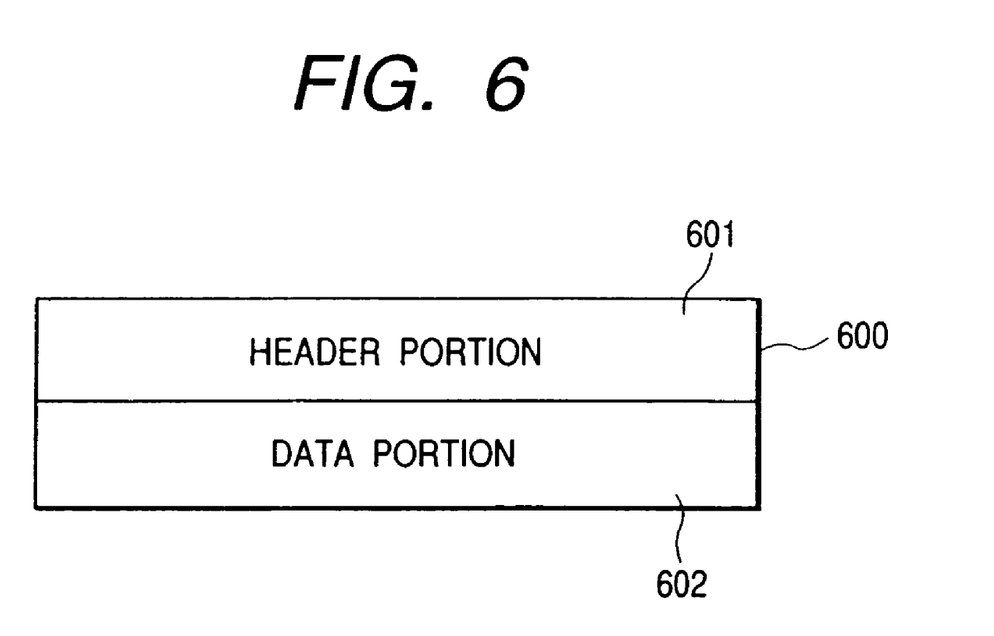
FIG. 6 is a diagram showing a logical structure of PDL data in an embodiment of the invention.

PDL data 600 has a logical structure, as shown in FIG. 6. In FIG. 6, reference numeral 601 denotes a header portion showing information regarding a description language (LIPS), a paper size, an output mode, such as single side/both sides, or the like, the number of print copies, and the like. Reference numeral 602 denotes print data written by the description language shown in the header portion 601. There is also a case in which data for a plurality of pages has been written.

Returning to FIG. 5, in step S502, a coin throw-in picture plane is displayed by the operation unit 115 at a point when the set-up of all component elements has been completed.

In step S503, if coins have been inserted into the coin receiving unit 14, step S504 follows. If no coin is inserted, the processing routine is returned to step S503. In step S503, the number of coins (fee) which is necessary for printing, is not determined, but whether the coins have been thrown in or not, is determined. This process is performed to discriminate whether the user who intends to print exists near the hybrid apparatus or not. Therefore, if the coins have been thrown in, in step S503, it is regarded that the user exists near the apparatus, so that the processes in step S504 and subsequent steps are executed.

In step S504, the core unit 10 receives a notification of the coin insertion from the coin receiving unit 14, and turns on a print ready signal. In response to this signal, the formatter unit 8 (PDL) is enabled, to receive the PDL data.

In step S505, the PDL data is transferred from the PC/WS 12 to the formatter unit 8 via the computer interface unit 7 and actually developed by the operation of the PC/WS 12 or the operation of the operation unit 115. By interpreting the header portion 601, the output mode (monochrome/color, paper size, resolution, single side/both sides, etc.) is determined and notified to the core unit 10.

In step S506, a calculation of a fee necessary for printing the first side is executed by the same method as the charging method of the copy on the basis of the output mode determined in step S505. If an amount of money inserted into the coin receiving unit 14 is sufficient, step S507 follows. If it is insufficient, the processing routine is returned to step S502.

In step S507, the print data is sent from the formatter unit 8 to the core unit 10 and the printing is actually executed. In step S508, an actual charging process, such that the fee for the printed original is subtracted from the fee of money inserted into the coin receiving unit 14, or the like, is executed.

In step S509, whether there is a page, which is not printed yet in the data developed in step S505 or not, is discriminated. If the printing of all pages has been completed, the processing routine is finished. If there are still pages to be printed, the processing routine is returned to step S506. The remaining pages are printed in steps S506, S507, an S508.

According to the embodiment as described above, the copy charging system can be used in the image forming apparatus having the printer function.

Particularly, when the amount of money is insufficient, a logic of the copy with positive achievements can be used in common, so that an extremely high affinity for the user can be assured.

By recognizing the payment of the amount of money irrespective of the paid amount of money, a fact that the user exists near the apparatus is recognized. Therefore, the reception control of the data can be performed at the optimum building.

If the paid amount of money is insufficient, even during the output of the data, which has already been received, that operation can be interrupted at the halfway mark.

Second Embodiment

Since an image processing apparatus in the second embodiment is also similar to that shown in FIGS. 1 to 4 and described in the first embodiment, its detailed description is omitted.

A flow of a charging system of a digital hybrid apparatus in the embodiment will now be described herein below with reference to FIG. 7.

Figure 7:
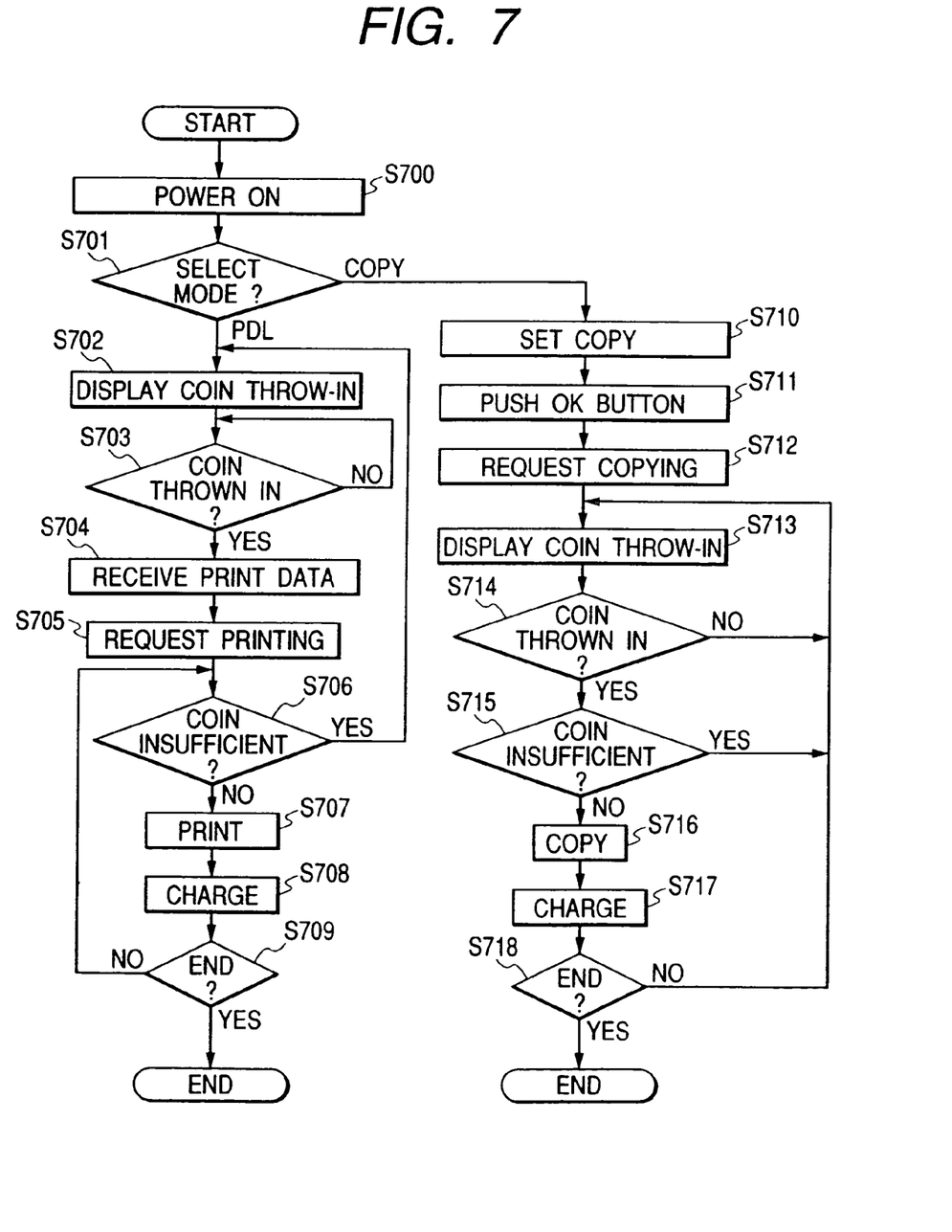
FIG. 7 is a flowchart showing an example of the operation of a charging system in a second embodiment of the invention.

In step S700 in FIG. 7, the ordinary copy activating operation is executed under the control of the core unit 10 at the same time of turn-on of a power source. Although an initializing process is executed for the formatter unit 8 (PDL), the control mode is not shifted to a mode in which the PDL (Page Description Language) data from the PC/WS 12 can be received, but is kept in a state where the PDL data is not received, by setting the mode into a print standby mode.

The PDL data 600 has the logical structure as shown in FIG. 6. In FIG. 6, reference numeral 601 denotes the header portion showing information regarding the setting of the description language (LIPS), paper size, output mode, such as single side/both sides, or the like, the number of print copies, and the like. Reference numeral 602 denotes the print data written by the description language shown in the header portion 601. There is also a case in which data for a plurality of pages has been written.

Figure 8:
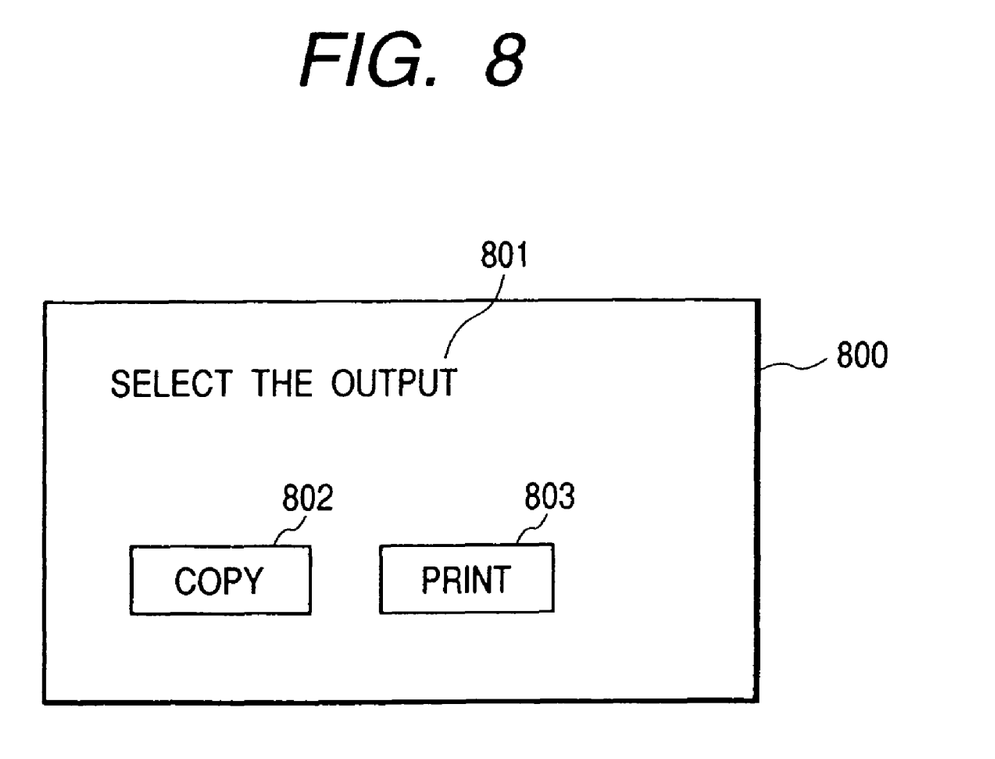
FIG. 8 shows a display example upon function selection in the second embodiment of the invention.

In step S701, as shown in FIG. 8, a message 801 to prompt the operation unit 115 to select the mode, an operation button 802 to select the copy function, and an operation button 803 to select the printer function of the PDL data are displayed, and a picture plane to select one of the functions is displayed. When the printer function is selected, step S702 follows. When the copy function is selected, step S710 follows. Although a state where the copy function and printer function can be selected is show in FIG. 8, it is also possible to display the other functions, such as a facsimile function, and the like, and to enable them to be selected.

In step S702, the coin insert picture plane is displayed on the operation unit 115 at a point when all of the setup processes are completed. In this case, the output in the non-selected copy function is guarded, thereby preventing that the copy of the original in the document feeder or on the platen glass (hereinafter, referred to as "on the copyboard") is erroneously outputted.

In step S703, if the coins are inserted into the coin receiving unit 14, step S704 follows. If NO, the processing routine is returned to step S703. In step S703, the number of coins (fee) necessary for printing is not determined, but whether the coins have been inserted or not, is determined. This judgment is made to discriminate that the user who intends to print exists near the hybrid apparatus. Therefore, if the coins were inserted, in step S703, it is regarded that the user is near the apparatus. The processes in step S704 and subsequent steps are then executed.

In step S704, the core unit 10 receives a notification of the coin insertion from the coin receiving unit 14 and turns on the print ready signal. In response to this signal, the formatter unit 8 (PDL) is enabled to receive the PDL data. Although the formatter unit 8 is enabled to receive the PDL data when the coins are inserted into the coin receiving unit 14 here, it is also possible to enable the formatter unit 8 to receive the PDL data when the printer function is selected, in step S701. This is because it is possible to determine that the user who intends to print exists near the hybrid apparatus at a point when the printer function is selected by the operation unit 115. In step S705, the PDL data is transferred from the PC/WS 12 to the formatter unit 8 via the computer interface unit 7 and actually developed by the operation of the PC/WS 12 or the operation of the operation unit 115. By interpreting the header portion 601, the core unit 10 is notified of the output mode (monochrome/color, paper size, resolution, single side/both sides).

In step S706, a calculation of a fee necessary for printing the first side is executed by the same method as the charging method of the copy on the basis of the output mode determined in step S705, that is, on the basis of the output mode of the printer function of the PDL data. If the amount of money inserted into the coin receiving unit 14 is insufficient, step S707 follows. If the amount is insufficient, the processing routine is returned to step S702.

In step S707, the print data is sent from the formatter unit 8 to the core unit 10, and the printing is actually executed. In step S708, an actual charging process, such that the fee for the printed originals is subtracted from the fee for the printed originals is subtracted from the fee of money inserted into the coin receiving unit 14, is executed at a point of the print completion.

In step S709, a determination is made also whether there exists a page, which is not printed yet in the data developed in step S705. If the printing of all pages has been completed, the processing routine is finished. If there is a page yet to be printed, the processing routine is returned to step S706. The remaining pages are printed in steps S706, S707, and S708.

As described above, when the printer function is selected in step S701, even if the original is put on the copyboard, it is possible to prevent the copying operation from being started.

When the copy function is selected in step S701, the apparatus is guarded lest the data other than the data of the original read by the reader unit 1 (that is, the data other than the copy function, such as data which has been developed by the formatter unit 8 upon selection of the printer function and remained and stored in the memory without being printed) is inputted from the core unit 10 and erroneously printed. In step S710, a copy setting (monochrome/color, paper size, resolution, single side/both sides) is displayed to the operation unit 115. In step S711, when the copy setting is performed and the operation to start the copy (push an OK button (not shown), or the like) is executed, step S712 follows. The set output mode is sent from the reader unit 1 to the core unit 10. The core unit 10 calculates a copy fee of one original on the basis of the decided output mode. In step S713, the calculated copy fee and the coin insert picture plane are displayed to the operation unit 115.

If it is determined in steps S714 and S715 that the fee necessary for copying at least one sheet of an original in the set output mode has been thrown in, on the basis of the notification from the coin receiving unit 14, the core unit 10 turns on the print ready signal. In step S716, the original on the copyboard is read, the process to print the read image by the printer unit 2 is started.

In step S717, the actual charging process, such that the fee for the printed original is subtracted from the fee of money inserted into the coin receiving unit 14, or the like, is executed.

In step S718, a determination is made as to whether the original, which is not copied yet, exists on the copyboard or not. If there is an unprocessed original, the processing routine is returned to step S713 and a process for copying the remaining originals is executed. If NO, the processing routine is finished.

It is assumed that that insertion of coins into the coin receiving unit 14 can be performed before the coin insertion is displayed, after the selection of the copy function. In this case, as a fee to be displayed, the fee obtained by subtracting the fee necessary for printing from the fee which has already been inserted (that is, the fee necessary for starting the printing) can be displayed, or both the necessary fee and the fee necessary for printing one sheet of an original can also be displayed.

As mentioned above, when the copy function is selected, in step S701, even if the print data upon selection of the printer function remains in the memory, or the like, it is possible to prevent the print data from being erroneously printed.

According to the embodiment as mentioned above, it is possible to prevent the data which has to be outputted by a function other than the selected function from being erroneously outputted. Therefore, a misprinting in an environment such that various users use the same apparatus can be prevented.

According to the embodiment, therefore, the copy charging system can be used in the image forming apparatus having the copy function and the printer function.

Particularly, an erroneous output of the data can be easily and certainly prevented by managing the operations in the sequence process of each of the copy function and the printer function. For example, it is possible to prevent a situation such that when the print data of PDL, or the like, remains in the apparatus without being printed, even though the copy user has inserted coins in the coin receiving unit, the print data, which was left by the previous user, is erroneously printed. It is also possible to prevent a situation in which the original on the copyboard is copied, even if the original for copying is left on the copyboard or the print user has inserted coins in the coin receiving unit.

Third Embodiment

Since an image processing apparatus in the third embodiment is also similar to that shown in FIGS. 1 to 4, and described in the first embodiment, its detailed description is omitted.

A flow of a charging system of a digital hybrid apparatus in the embodiment will now be described with reference to FIGS. 9 and 10. An explanation will be made with respect to a case where the printer function is selected in the digital hybrid apparatus in the embodiment. The case in which the other function is selected is similar to that in the second embodiment mentioned above.

Figure 9:
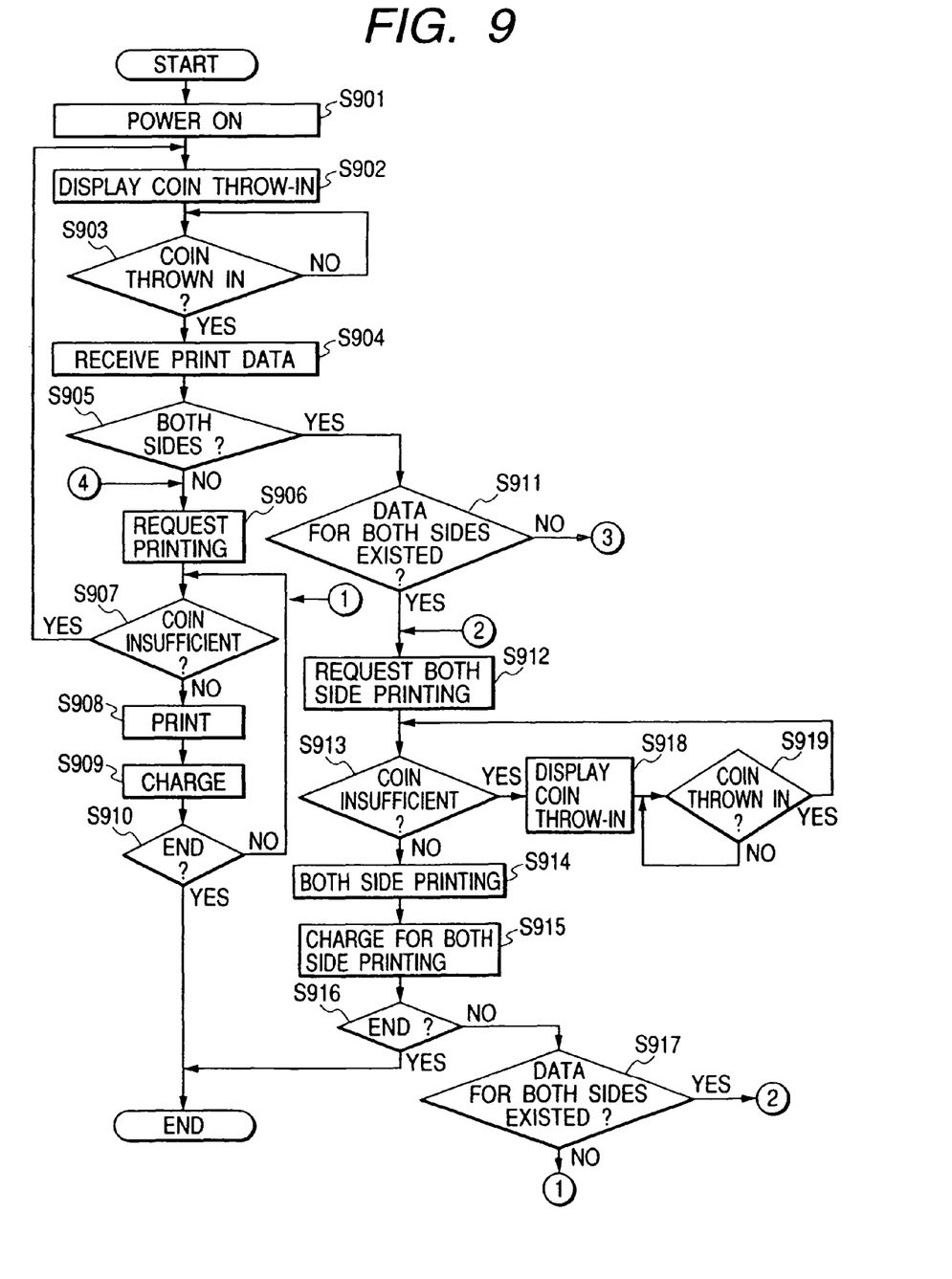
FIG. 9 is a flowchart showing an example of the operation of a charging system in a third embodiment of the invention.

In step S901 in FIG. 9, the ordinary copy activating operation is executed under the control of the core unit 10 at the time of turn-on of a power source. Although an initializing process is executed for the formatter unit 8 (PDL), the control mode is not shifted to a mode in which the PDL (Page Description Language) data from the PC/WS 12 can be received, but is kept in a state where the PDL data is not received, by setting the mode into a print standby mode.

The PDL data 600 has the logical structure as shown in FIG. 6. In FIG. 6, reference numeral 601 denotes the header portion showing information regarding the setting of the description language (LIPS), paper size, output mode, such as single side/both sides, or the like, the number of print copies, and the like. Reference numeral 602 denotes the print data written by the description language shown in the header portion 601. There is also a case in which data for a plurality of pages has been written in the data portion 602.

In step S902, the coin insert picture plane is displayed to the operation unit 115 at a point when all of the setup operations have been completed.

In step S903, if coins have been inserted into the coin receiving unit 14, step S904 follows. If no coin is inserted, the processing routine is returned to step S903. In step S903, the number of coins (fee), which is necessary for printing, is not determined, but whether the coins have been inserted or not is determined. This process is performed to determine whether a user who intends to print exists near the hybrid apparatus or not. Therefore, if the coins have been inserted in step S903, it is regarded that the user exists near the apparatus, so that the process in step S904 and subsequent steps are executed.

In step S904, the core unit 10 receives a notification of the coin inserted from the coin receiving unit 14 and turns on the print ready signal. In response to this signal, the formatter unit 8 (PDL) is enabled to receive the print data.

In step S905, the PDL data is transferred from the PC/WS 12 to the formatter unit 8 via the computer interface unit 7 and actually developed by the operation of the PC/WS 12 or the operation of the operation unit 115. By interpreting the header portion 601, monochrome/color, paper size, resolution, and single side/both sides are determined as an output mode. In the case of the single-side printing, step S906 follows. In the case of the both-side printing, step S911 follows.

In the case of the single-side printing, in step S906, the core unit 10 is notified of the output mode (monochrome/color, paper size, resolution, and single-side printing) determined in step S905.

In step S907, a calculation of a fee necessary for printing the first side is executed by the same method as the charging method of the copy, on the basis of the output mode determined in step S905. If an amount of money inserted into the coin receiving unit 14 is sufficient, step S908 follows. If the amount is insufficient, the processing routine is returned to step S902.

In step S908, the print data is sent from the formatter unit 8 to the core unit 10, and the printing is actually executed. In step S909, an actual charging process, such that the fee for the printed originals is subtracted from the fee of money inserted into the coin receiving unit 14, is executed.

In step S910, whether there is a page, which is not printed yet in the data developed in step S905 or not, is determined. If the printing of all pages has been completed, the processing routine is finished. If there is a page to be printed, the processing routine is returned to step S907. The remaining pages are printed in steps S907, S908, and S909.

In the case of both-side printing, whether the data developed in the formatter unit 8 (PDL) is the data for both sides (the first side and the second side) or not is discriminated in step S911. If there is the data for both sides, in step S912, the core unit 10 is notified of the output mode (monochrome/color, paper size, resolution, and both-side printing), which corresponds to a combination of the first and second sides and has been clarified in step S905.

In step S913, a calculation of a fee necessary for printing the first side is executed on the basis of the output mode determined in step S905. If an amount of money inserted into the coin receiving unit 14 is sufficient, step S914 follows. If it is insufficient, the processing routine advances to step S918. The coin insert picture plane is displayed in the operation unit 115. If coins are inserted into the coin receiving unit 14 in step S919, the processing routine is returned to step S913.

In step S914, the print data for both sides is sent from the formatter unit 8 to the core unit 10 and the both-side printing is actually executed. In step S915, the actual charging process such that the fee for the printed originals is subtracted from the fee of money inserted into the coin receiving unit 14, or the like, is executed.

In step S916, whether there is a non-printed page in the data developed in step S905 or not is determined. If the printing for all pages has been completed, the processing routine is finished. If there is a page to be printed, whether the data for both sides, which is not printed yet, exists or not, is determined, in step S917. If there is data for both sides, the processing routine is returned to step S912 and the both-side printing process is executed. If NO, that is, if there is only the data for a single side, it is determined that the page to be printed is the last page, and step S907 follows. The foregoing single-side printing process is executed.

Figure 10:
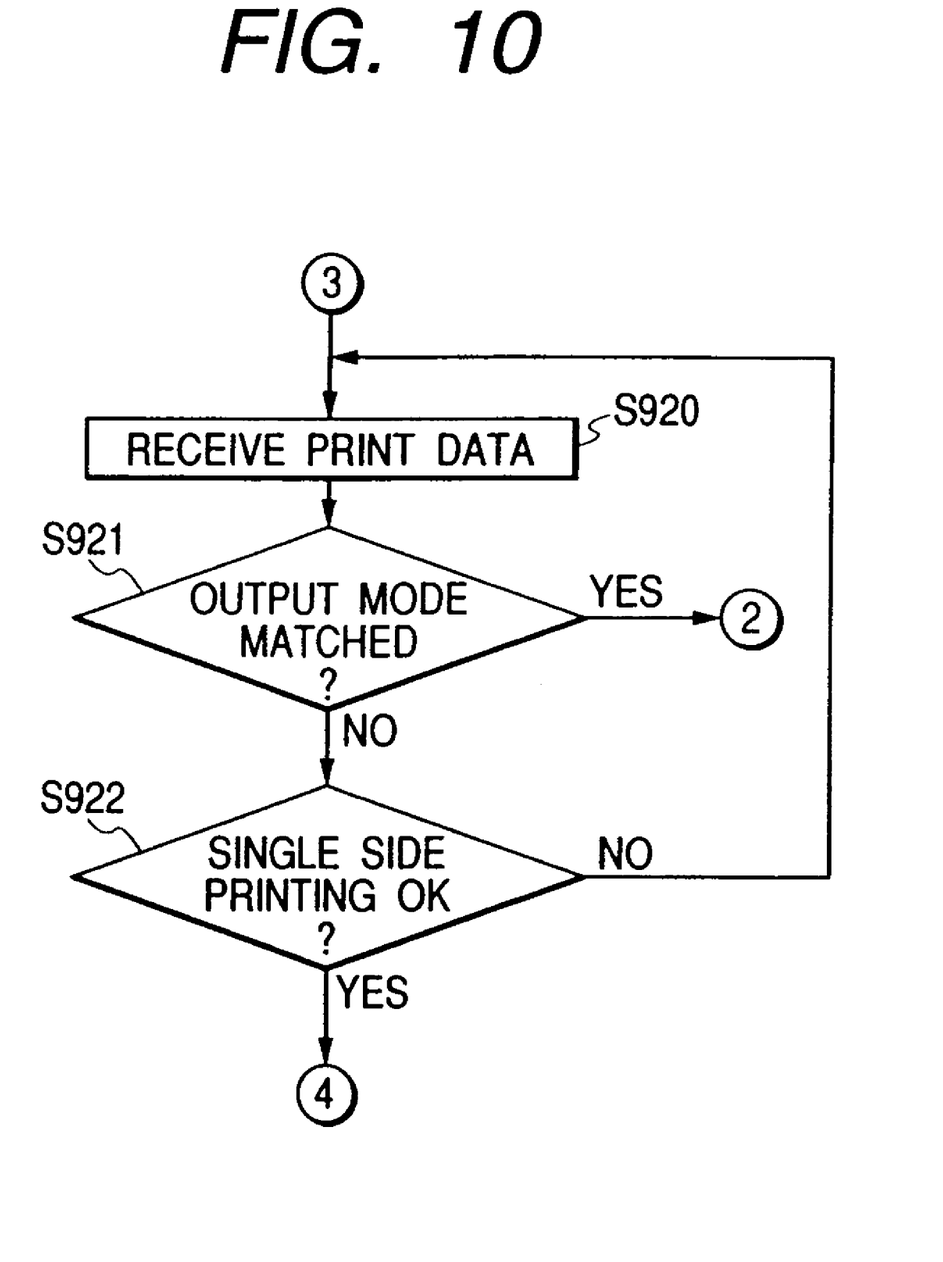
FIG. 10 is a flowchart showing an example of the operation of the charging system in the third embodiment of the invention.

If the data for both sides does not exist in step S911, that is, if the data developed in step S905 is the data only for a single side, in step S920 in FIG. 10, the formatter unit 8 (PDL) is enabled to receive the PDL data in order to receive the data for the second side. When the PDL data is transferred from the PC/WS 12, in step S921, the transferred data is developed in the formatter unit 8 and the header portion 601 of the developed data is interpreted, thereby determining that the output mode (monochrome/color, paper size, resolution, single side/both sides) is clarified. Whether the output mode coincides with the output mode analyzed in step S905 or not is determined. If the output mode coincides as a result of the determination, step S912 follows. The core unit 10 is notified of the data of the first side developed in step S905 and the data of the second side developed in step S921, as data for both sides, together with the output mode. The both-side printing process in step S913 and subsequent steps are executed.

If the output mode does not coincide in step S921, step S922 follows. In step S922, a message such as "Do you want to perform single-side printing?", or the like, is displayed on the display unit of the operation unit 115, thereby inquiring of the user about whether the data developed in step S905 and the data developed in step S921 can be printed in the single side mode or not. If single-side printing is instructed by the operation of the operation unit 115, step S906 follows. The processes in step S906 and subsequent steps are executed, thereby setting the item of both sides of the analyzed output mode to "single side" and single-side printing each of the data developed in step S905 and the data developed in step S921.

If the single-side printing is not instructed in step S922, the processing routine is returned to step S920 and the data whose both-side printing has been designated is received again.

According to the embodiment as described above, the copying charging system can be used in the image forming apparatus having the printer function.

Particularly, a load of the user in the both-side printing mode can be reduced. There is no need to execute a complicated process of recovery such that the single-side printing is interrupted due to the insufficient fee in the both-side printing mode.

The invention also incorporates a case in which, in order to make various devices operative, so as to realize the functions of the embodiment mentioned above, program codes of software to realize the functions of the embodiments are supplied to a computer in an apparatus or a system connected to the various devices, and the various devices are operated in accordance with a program stored in a computer (a CPU or an MPU) of the system or apparatus, thereby realizing those functions.

In this case, the program codes themselves of the software realize the functions of the embodiments mentioned above. The program codes themselves and means for supplying the program codes to a computer, for example, a memory medium, in which such program codes have been stored, construct the invention. As such a memory medium for storing the program codes, for example, it is possible to use a floppy disk, a hard disk, an optical disk, a magneto-optical disk, a CD-ROM, a magnetic tape, a non-volatile memory card, a ROM, or the like.

Naturally, the program codes are incorporated in the embodiments of the invention, not only in the case wherein the computer executes the supplied program codes, thereby realizing the functions of the embodiments mentioned above, but also, in the case wherein the functions of the embodiments mentioned above are realized by the program codes in cooperation with the OS (Operating System), which operates in a computer or with another application software, or the like.

Further, the invention also incorporates a case in which the supplied program codes are stored into a memory equipped for a function expanding board of a computer or a function expanding unit connected to a computer and, thereafter, a CPU, or the like, provided for the function expanding board or function expanding unit executes a part of or all of the actual processes, on the basis of instructions of the program, so that the functions of the embodiments mentioned above are realized by those processes.

As described above, according to the invention, the copy charging system also can be applied to the image processing apparatus having the function for print outputting the data, such as PDL data, or the like.

The foregoing various effects can be obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image forming apparatus, comprising:
   a receiving device which receives coded data to be printed from an external apparatus;
   a reading device which reads a document;
   a formatter unit which develops the coded data transferred from the receiving device into image data;
   a print unit which selectively prints out the document read by the reading device and the image data developed by the formatter unit;
   a selecting device which selects one of a print function of printing the coded data received by said receiving device and a copy function of printing the document read by said reading device, in accordance with an operation of a user;
   a cash receiving unit which receives money from the user; and
   a controller which controls, (i) in the case where the print function is selected by the user with the selecting device and money is received by the cash receiving unit, the formatter unit is switched from a state of not receiving the coded data from the receiving device to a state of being capable of receiving the coded data, the formatter unit develops the coded data into the image data, a fee for printing is calculated based on information included in the coded data, and if an amount of the fee for printing received by the cash receiving unit is sufficient, the print unit prints out the image data developed by the formatter unit, and (ii) in the case where the copy function is selected by the user with the selecting device, a fee for copying a first sheet is calculated based on copy settings, and if an amount of the fee for copying received by the cash receiving unit is sufficient, the print unit prints out the document read by the reading device.

2. The apparatus according to claim 1, wherein the controller controls, (i) in the case where the print function is selected with the selecting device, copying by the copy function is inhibited, and (ii) in the case where the copy function is selected with the selecting device, printing by the print function is inhibited.

3. The apparatus according to claim 2, wherein the controller, in the case where the copy function is selected with the selecting unit, inhibits the printing of the image data even if the image data developed by the formatter unit is stored in a memory without being printed out.

4. A control method for an image forming apparatus having a receiving device which receives coded data to be printed from an external apparatus, a reading device which reads a document, a formatter unit which develops the coded data transferred from the receiving device into image data, a print unit which selectively prints out the document read by the reading device and the image data developed by the formatter unit, and a cash receiving unit which receives money from a user, said method comprising the steps of:

controlling, in the case of a print function is selected by the user and money is received by the cash receiving device, the formatter unit to switch from a state of not receiving the coded data from the receiving device to a state of being capable of receiving the coded data, the formatter unit to develop the coded data into the image data, a calculation of a fee for printing based on information included in the coded data, and if an amount of the fee for printing received by the cash receiving unit is sufficient, the print unit to print out the image data developed by the formatter unit; and controlling, in the case where the copy function is selected by the user, a calculation of a fee for copying a first sheet based on copy settings, and if an amount of the fee for copying received by the cash receiving unit is sufficient, the print unit to print out the document read by the reading device.

5. A storage medium for storing a computer executable program of a control method for an image forming apparatus having a receiving device which receives coded data to be printed from an external apparatus, a reading device which reads a document, a formatter unit which develops the coded data transferred from the receiving device into image data, a print unit which selectively prints out the document read by the reading device and the image data developed by the formatter unit, and a cash receiving unit which receives money from a user, said program comprising the steps of:

controlling, in the case of a print function is selected by the user and money is received by the cash receiving device, the formatter unit to switch from a state of not receiving the coded data from the receiving device to a state of being capable of receiving the coded data, the formatter unit to develop the coded data into the image data, a calculation of a fee for printing based on information included in the coded data, and if an amount of the fee for printing received by the cash receiving unit is sufficient, the print unit to print out the image data developed by the formatter unit; and controlling, in the case where the copy function is selected by the user, a calculation of a fee for copying a first sheet based on copy settings, and if an amount of the fee for copying received by the cash receiving unit is sufficient, the print unit to print out the document read by the reading device.

* * * * *